(12) United States Patent
Ratner et al.

(10) Patent No.: US 7,920,720 B2
(45) Date of Patent: Apr. 5, 2011

(54) COMPUTER-IMPLEMENTED METHOD FOR OBJECT CREATION BY PARTITIONING OF A TEMPORAL GRAPH

(75) Inventors: Edward R. Ratner, Los Altos, CA (US); Schuyler A. Cullen, Mt. View, CA (US); Darius John Sadri, Voorschoten (NL)

(73) Assignee: Keystream Corporation, Mountain View, CA (US)

( * ) Notice: Subject to any disclaimer, the term of this patent is extended or adjusted under 35 U.S.C. 154(b) by 953 days.

(21) Appl. No.: 11/821,636

(22) Filed: Jun. 25, 2007

(65) Prior Publication Data

US 2008/0123957 A1    May 29, 2008

Related U.S. Application Data

(60) Provisional application No. 60/805,796, filed on Jun. 26, 2006.

(51) Int. Cl.
*G06K 9/00*  (2006.01)
*H04N 11/02* (2006.01)
*H04N 7/14*  (2006.01)

(52) U.S. Cl. .............. 382/103; 375/240.01; 375/240.16; 348/14.1

(58) Field of Classification Search .................. 382/103, 382/107, 164, 171, 172, 173, 190, 242; 348/14.1, 348/14.15, 97, 154, 155, 715, 169, 441; 375/240.01, 375/240.08, 240.12, 240.16, 240.24, 240.25; 345/475, 691; 380/212
See application file for complete search history.

(56) References Cited

U.S. PATENT DOCUMENTS

| 5,635,986 | A | | 6/1997 | Kim |
| 5,793,893 | A | | 8/1998 | Kim |
| 5,802,220 | A | | 9/1998 | Black et al. |
| 5,828,790 | A | | 10/1998 | Kim |
| 6,006,265 | A | * | 12/1999 | Rangan et al. ............... 709/226 |
| 6,185,314 | B1 | | 2/2001 | Crabtree et al. |
| 6,205,175 | B1 | * | 3/2001 | Cho ...................... 375/240.08 |
| 6,266,053 | B1 | | 7/2001 | French et al. |
| 6,546,135 | B1 | * | 4/2003 | Lin et al. ..................... 382/190 |
| 6,665,423 | B1 | * | 12/2003 | Mehrotra et al. ............ 382/107 |
| 7,269,221 | B2 | * | 9/2007 | Prakash et al. .......... 375/240.25 |
| 7,609,888 | B2 | * | 10/2009 | Sun et al. .................... 382/173 |
| 2002/0129384 | A1 | | 9/2002 | Planterose |
| 2006/0036564 | A1 | | 2/2006 | Yan et al. |
| 2006/0074870 | A1 | | 4/2006 | Brill et al. |
| 2007/0211945 | A1 | | 9/2007 | Kaneko et al. |

OTHER PUBLICATIONS

PCT International Search Report for Application No. PCT/US07/14741, Sep. 24, 2008 (3 sheets).

* cited by examiner

*Primary Examiner* — Abolfazl Tabatabai
(74) *Attorney, Agent, or Firm* — Okamoto & Benedicto LLP

(57) ABSTRACT

One embodiment relates to a computer-implemented method for the automated extraction of objects from a video stream. The method includes an automated procedure for creating a temporal graph, and an automated procedure for cutting the graph into graph partitions. The method further includes an automated procedure for mapping the graph partitions to pixels in frames of the video stream. Other features, aspects and embodiments are also disclosed.

14 Claims, 7 Drawing Sheets

COMPUTER-IMPLEMENTED METHOD FOR OBJECT CREATION BY PARTITIONING OF A TEMPORAL GRAPH

CROSS-REFERENCE TO RELATED APPLICATIONS

The present application claims the benefit of U.S. Provisional Patent Application No. 60/805,796 filed Jun. 26, 2006, by inventors Edward R. Ratner, Schuyler A. Cullen and Darius John Sadri, the disclosure of which is hereby incorporated by reference.

BACKGROUND

1. Field of the Invention

The present application relates generally to digital video processing and more particularly to the automated extraction of objects from a video stream.

2. Description of the Background Art

Video has become ubiquitous on the Web. Millions of people watch video clips everyday. The content varies from short amateur video clips about 20 to 30 seconds in length to premium content that can be as long as several hours. With broadband infrastructure becoming well established, video viewing over the Internet will increase.

However, unlike the hyperlinked static Web pages that a user can interact with—video watching on the Internet is, today, a passive activity. Users do not interact with the video. One way for users to be able to interact with the video is by creation of video hyperlinks, wherein an object in a video becomes clickable to enable some predefined action. The location of objects in the video stream and their identity are determined. One way to do that is manually going from frame to frame and outlining the objects of interest. Such manual outlining is, clearly, a very time-consuming, expensive process that will not provide a scalable solution as video viewing continues to explode over the Internet.

DETAILED DESCRIPTION

The present application discloses a computer-implemented method for automated object creation by partitioning of a temporal graph. In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present disclosure also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus or other data communications system.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the invention as described herein.

The present method and system enable coherent objects to be automatically extracted from a video stream in an effective and efficient manner. Once these objects are extracted, they may be used to, for example, create hyperlinks in a video stream, among various other potential uses.

Figure 1:
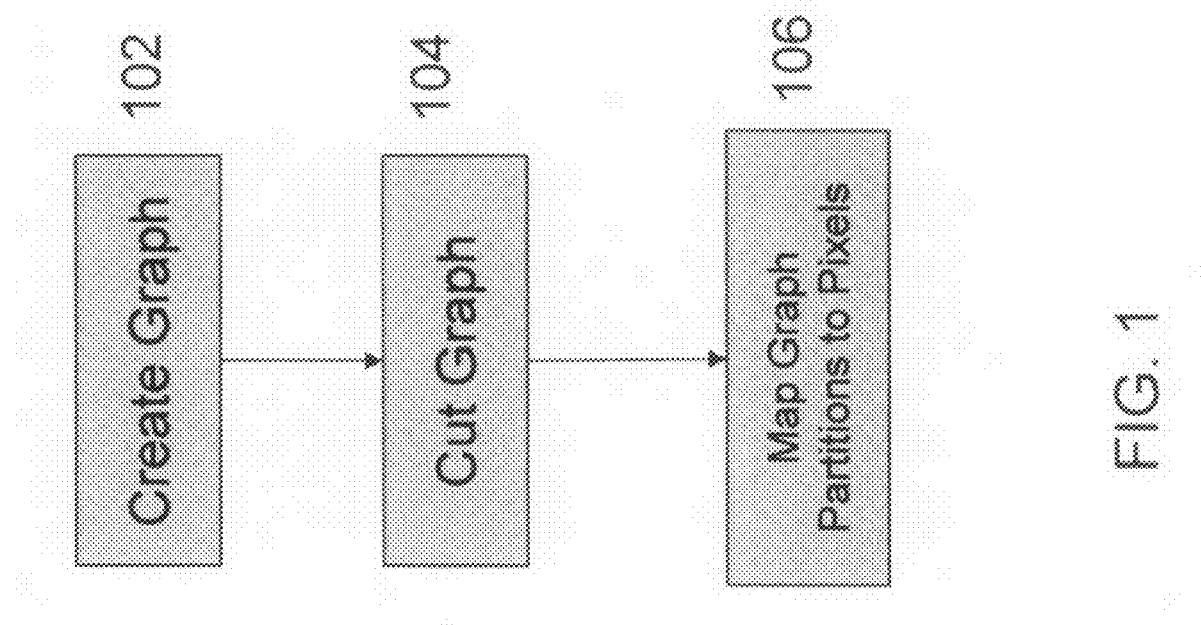
FIG. 1 is a flowchart of a method of object creation by partitioning of a temporal graph in accordance with an embodiment of the invention.

In accordance with an embodiment of the invention, the object creation method is depicted in the figures of the present application. FIG. 1 depicts a high-level flow chart of the method in accordance with an embodiment of the invention.

In a first phase, shown in block 102 of FIG. 1, a temporal graph is created. Example steps for the first phase are described below in relation to FIG. 2. In a second phase, shown in block 104, the graph is cut. Example steps for the second phase are described below in relation to FIG. 3. Finally, in a third phase, shown in block 106, the graph partitions are mapped to pixels. Example steps for the third phase are described below in relation to FIG. 5.

Figure 2:
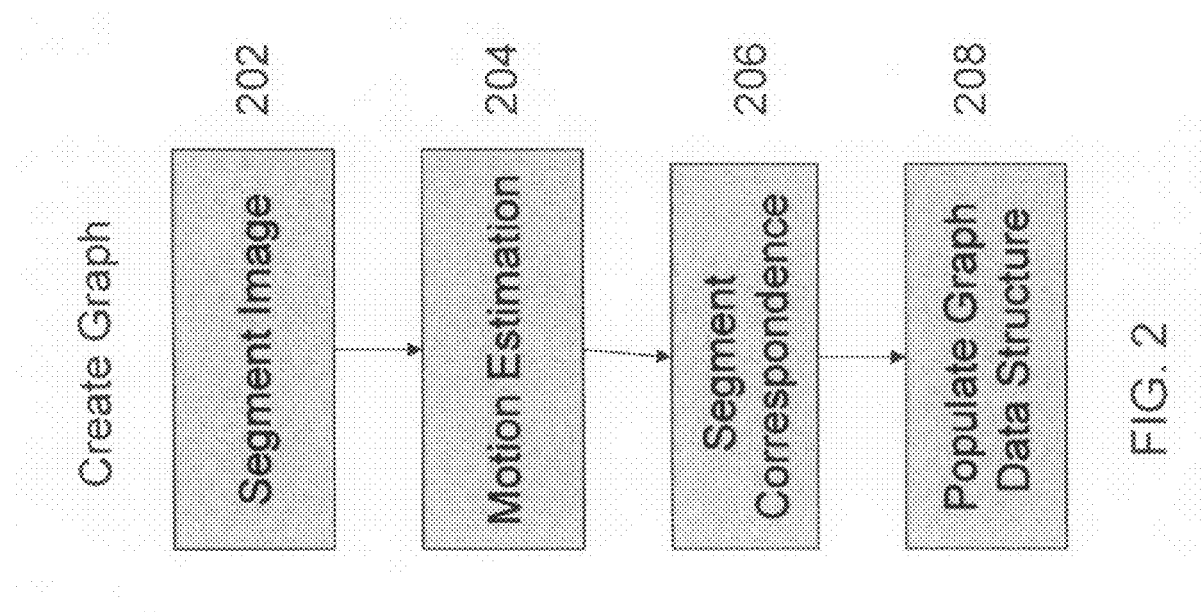
FIG. 2 is a flowchart of a method of creating a graph in accordance with an embodiment of the invention.

FIG. 2 is a flowchart of a method of creating a temporal graph in accordance with an embodiment of the invention. Per block 202 of FIG. 2, a given static image is segmented to create image segments. Each segment in the image is a region of pixels that share similar characteristics of color, texture, and possible other features. Segmentation methods include the watershed method, histogram grouping and edge detection in combination with techniques to form closed contours from the edges.

Per block 204, given a segmentation of a static image, the motion vectors for each segment are computed. The motion vectors are computed with respect to displacement in a future frame/frames or past frame/frames. The displacement is computed by minimizing an error metric with respect to the displacement of the current frame segment onto the target frame. One example of an error metric is the sum of absolute differences. Thus, one example of computing a motion vector for a segment would be to minimize the sum of absolute difference of each pixel of the segment with respect to pixels of the target frame as a function of the segment displacement.

Per block 206, segment correspondence is performed. In other words, links between segments in two frames are created. For instance, a segment (A) in frame 1 is linked to a segment (B) in frame 2 if segment A, when motion compensated by its motion vector, overlaps with segment B. The strength of the link is preferably given by some combination of properties of Segment A and Segment B. For instance, the amount of overlap between motion-compensated Segment A and Segment B may be used to determine the strength of the link, where the motion-compensated Segment A refers to Segment A as translated by a motion vector to compensate for motion from frame 1 to frame 2. Alternatively, the overlap of the motion-compensated Segment B and Segment A may be used to determine the strength of the link, where the motion-compensated Segment B refers to Segment B as translated by a motion vector to compensate for motion from frame 2 to frame 1. Or a combination (for example, an average or other mathematical combination) of these two may be used to determine the strength of the link.

Finally, per block 208, a graph data structure is populated so as to construct a temporal graph for N frames. In the temporal graph, each segment forms a node in the temporal graph, and each link determined per block 206 forms a weighted edge between the corresponding nodes.

Once the temporal graph is constructed as discussed above, the graph may be partitioned as discussed below. The number of frames used to construct the temporal graph may vary from as few as two frames to over twenty frames. The choice of the number of frames used preferably depends on the specific demands of the application.

Figure 3:
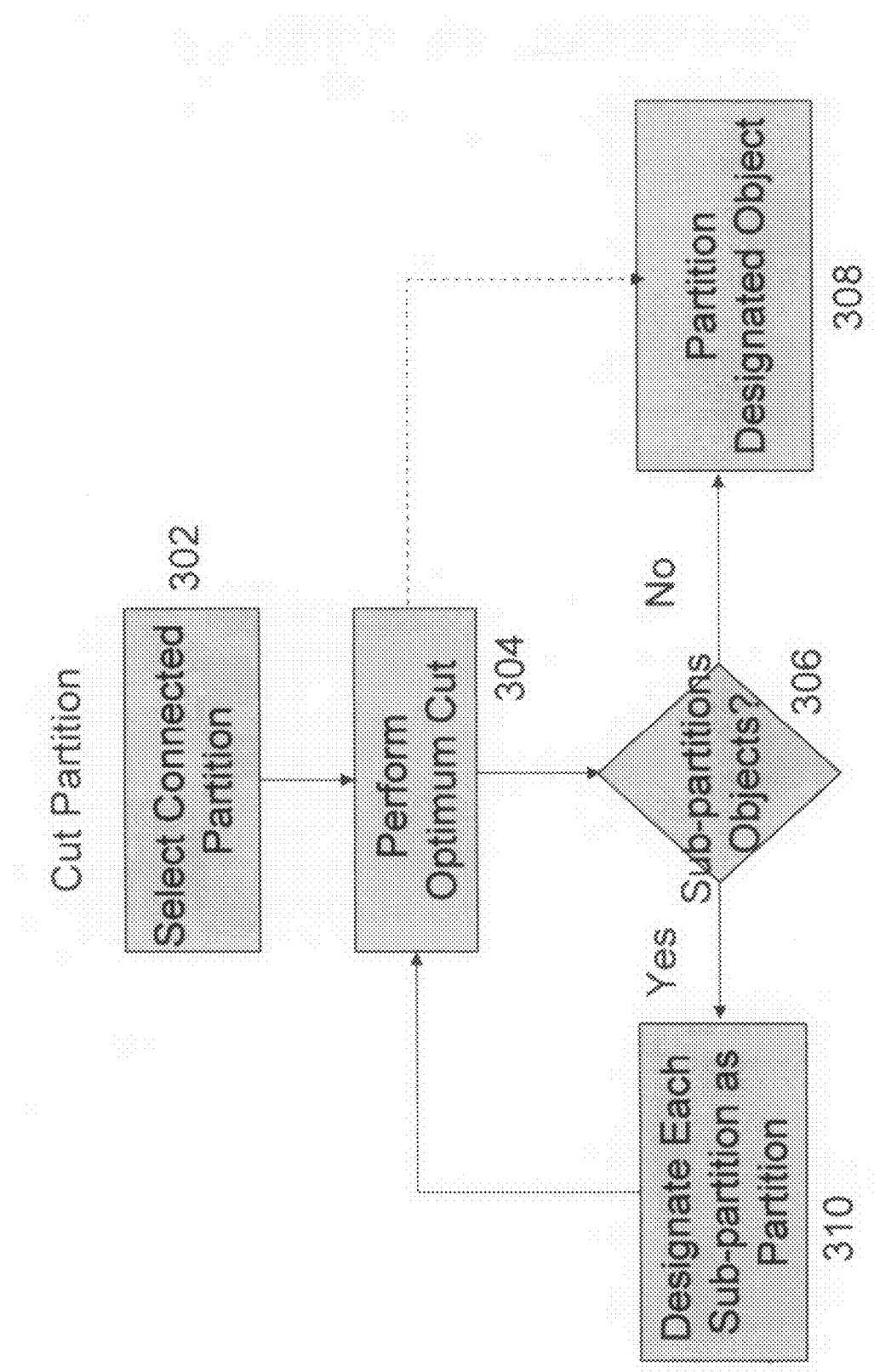
FIG. 3 is a flowchart of a method of cutting a partition in accordance with an embodiment of the invention.

FIG. 3 is a flowchart of a method of cutting a partition in the temporal graph in accordance with an embodiment of the invention. Partitioning a graph results in the creation of sub-graphs. Sub-graphs may be further partitioned.

In a preferred embodiment, the partitioning may use a procedure that minimizes a connectivity metric. A connectivity metric of a graph may be defined as the sum of all edges in a graph. A number of methods are available for minimizing a connectivity metric on a graph for partitioning, such as the "min cut" method.

After partitioning the original temporal graph, the partitioning may be applied to each sub-graph of the temporal graph. The process may be repeated until each sub-graph meets some predefined minimal connectivity criterion or satisfies some other statically-defined criterion. When the criterion (or criteria) is met, then the process stops.

In the illustrative procedure depicted in FIG. 3, a connected partition is selected 302. An optimum or near optimum cut of the partition to create sub-graphs may then be performed per block 304, and information about the partitioning is then passed to a partition designated object (per the dashed line between blocks 304 and 308). An example procedure for performing an optimum or near optimum cut is further described below in relation to FIG. 4.

Per block 306, a determination may be made as to whether any of the sub-partitions (sub-graphs) have multiple objects and so require further partitioning. In other words, a determination may be made as to whether the sub-partitions do not yet meet the statically-defined criterion. If further partitioning is required (statically-defined criterion not yet met), then each such sub-partition is designated as a partition per block 310, and the process loops back to block 304 so as to perform optimum cuts on these partitions. If further partitioning is not required (statically-defined criterion met), then a partition designated object has been created per block 308.

At the conclusion of this method, each sub-graph results in a collection of segments on each frame corresponding to a coherently moving object. Such a collection of segments, on each frame, form outlines of coherently moving objects that may be advantageously utilized to create hyperlinks, or to perform further operations with the defined objects, such as recognition and/or classification. Due to this novel technique, each object as defined will be well separated from the background and from other objects around it, even if they are highly overlapped and the scene contains many moving objects.

Figure 4:
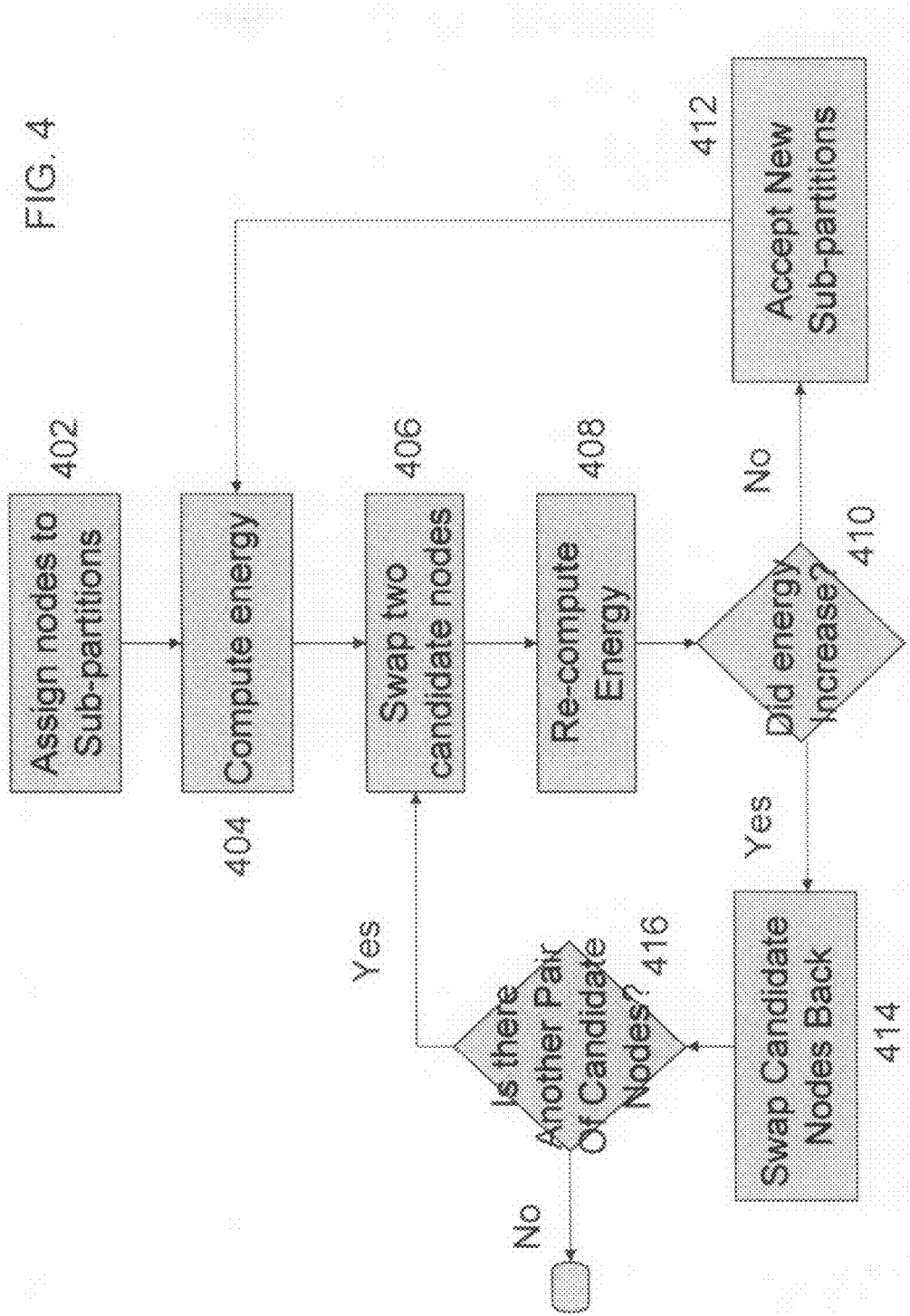
FIG. 4 is a flowchart of a method of performing an optimum or near optimum cut in accordance with an embodiment of the invention.

FIG. 4 is a flowchart of a method of performing an optimum or near optimum cut in accordance with an embodiment of the invention. First, nodes are assigned to sub-partitions per block 402, and an energy is computed per block 404.

As shown in block 406, two candidate nodes may then be swapped. Thereafter, the energy is re-computed per block 408. Per block 410, a determination may then be made as to whether the energy increased (or decreased) as a result of the swap.

If the energy decreased as a result of the swap, then the swap did improve the partitioning, so the new sub-partitions are accepted per block 412. Thereafter, the method may loop back to step 404.

On the other hand, if the energy increased as a result of the swap, then the swap did not improve the partitioning, so the candidate nodes are swapped back (i.e. the swap is reversed) per block 414. Then, per block 416, a determination may be made as to whether there is another pair of candidate nodes. If there is another pair of candidate nodes, then the method may loop back to block 406 where these two nodes are swapped. If there is no other pair of candidate nodes, then this method may end with the optimum or near optimum cut having been determined.

Figure 5:
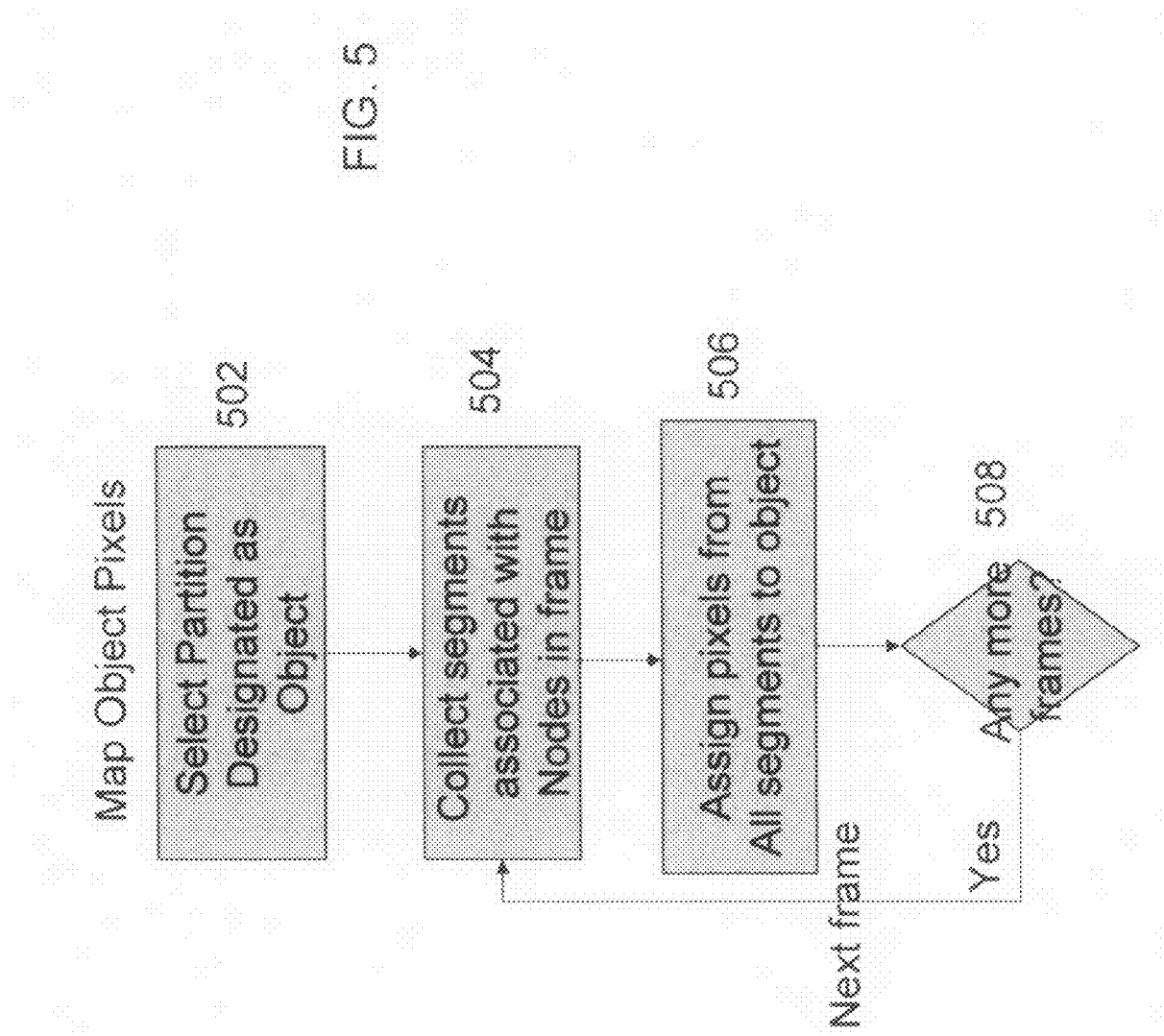
FIG. 5 is a flowchart of a method of mapping object pixels in accordance with an embodiment of the invention.

FIG. 5 is a flowchart of a method of mapping object pixels in accordance with an embodiment of the invention. This method may be performed after the above-discussed partitioning procedure of FIG. 3.

In block 502, selection is made of a partition designated as an object. Then, for each frame, segments associated with nodes of the partition are collected per block 504. Per block 506, pixels from all of the collected segments are then assigned to the object. Per block 508, this is performed for each frame until there are no more frames.

Figure 6:
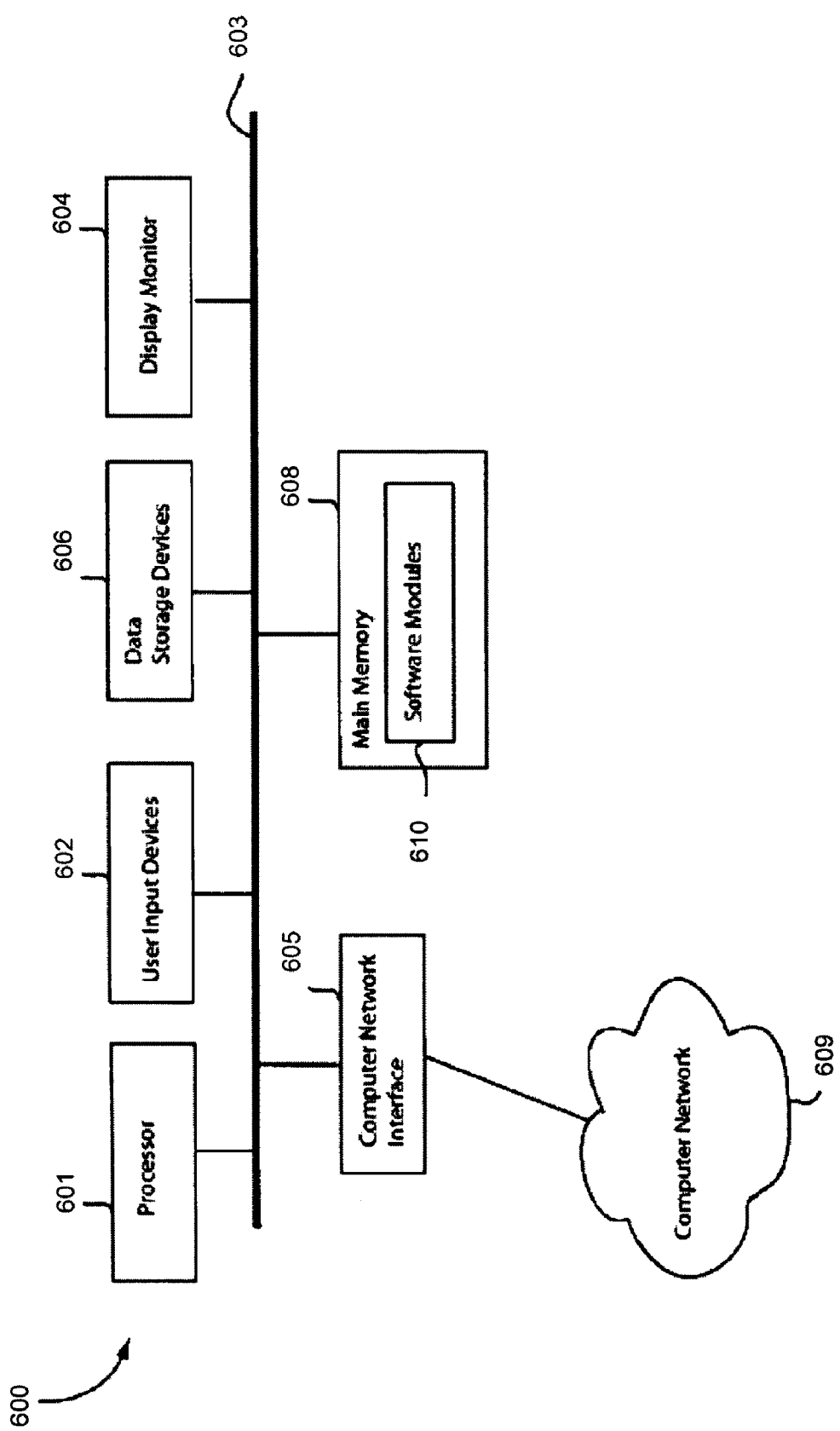
FIG. 6 is a schematic diagram of an example computer system or apparatus which may be used to execute the computer-implemented procedures in accordance with an embodiment of the invention.

FIG. 6 is a schematic diagram of an example computer system or apparatus 600 which may be used to execute the computer-implemented procedures in accordance with an embodiment of the invention. The computer 600 may have less or more components than illustrated. The computer 600 may include a processor 601, such as those from the Intel Corporation or Advanced Micro Devices, for example. The computer 600 may have one or more buses 603 coupling its various components. The computer 600 may include one or more user input devices 602 (e.g., keyboard, mouse), one or more data storage devices 606 (e.g., hard drive, optical disk, USB memory), a display monitor 604 (e.g., LCD, flat panel monitor, CRT), a computer network interface 605 (e.g., network adapter, modem), and a main memory 608 (e.g., RAM).

In the example of FIG. 6, the main memory 608 includes software modules 610, which may be software components to perform the above-discussed computer-implemented procedures. The software modules 610 may be loaded from the data storage device 606 to the main memory 608 for execution by the processor 601. The computer network interface 605 may be coupled to a computer network 609, which in this example includes the Internet.

Figure 7:
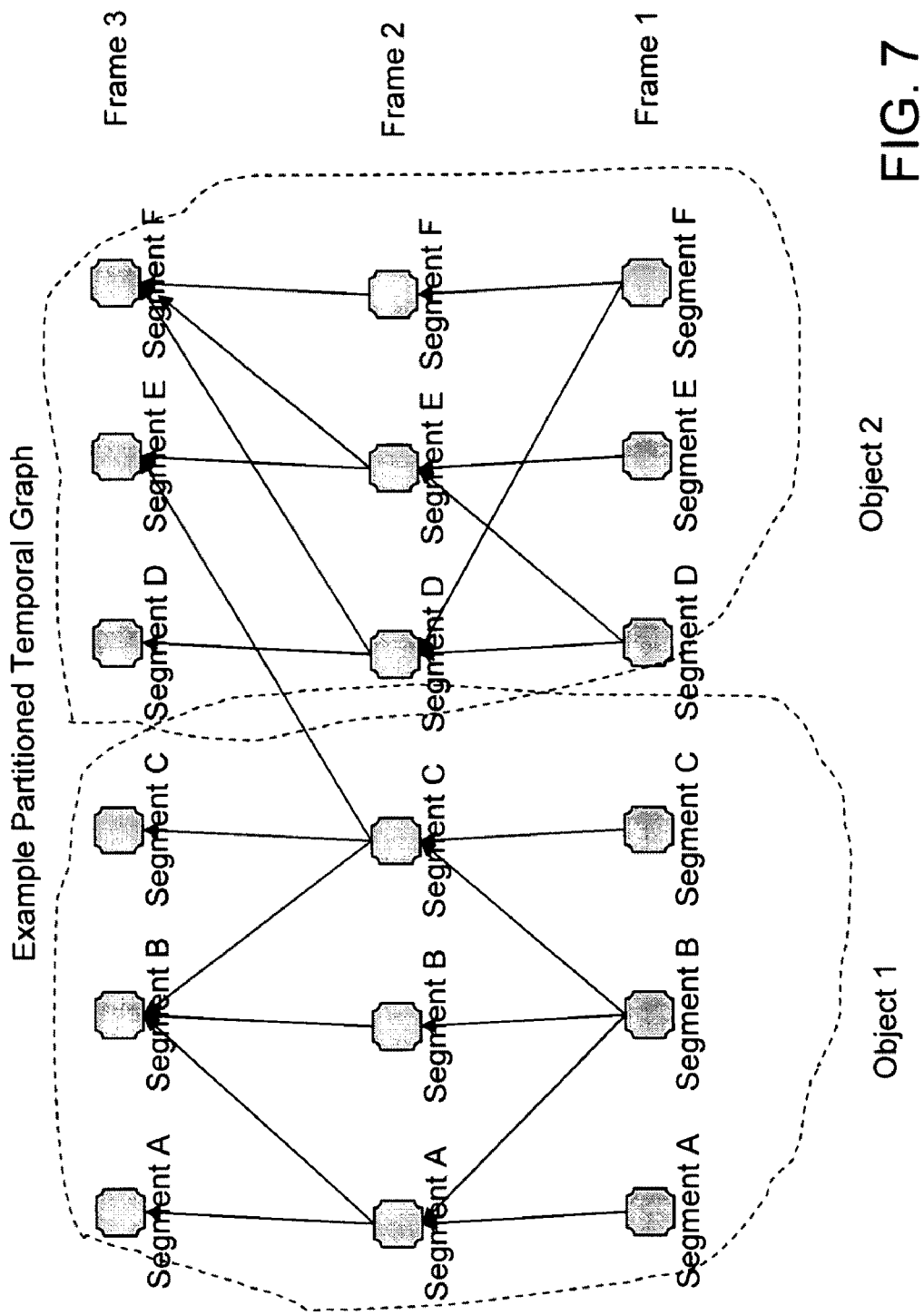
FIG. 7 is a schematic diagram showing an example partitioned temporal graph for illustrative purposes in accordance with an embodiment of the invention.

FIG. 7 is a schematic diagram showing an example partitioned temporal graph for illustrative purposes in accordance with an embodiment of the invention. This illustrative example depicts a temporal graph for six segments (Segments A through F) over three frames (Frames 1 through 3). The above-discussed links or edges between the segments are shown. Also depicted is illustrative partitioning of the temporal graph which creates two objects (Objects 1 and 2). As seen, in this example, the partitioning is such that Segments A, B, and C are partitioned to create Object 1, and Segments D, E and F are partitioned to create Object 2.

At the conclusion of this method, pixels are assigned to a coherently moving object in a video sequence. Such an assigned set of pixels may be advantageously utilized to create hyperlinks, or to perform further operations with the defined objects, such as recognition and/or classification. Due to the technique described herein, each object as defined will be well separated from the background and from other objects around it, even if they are highly overlapped and the scene contains many moving objects.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method for automated extraction of objects from a video stream, the method comprising:
   an automated procedure for creating a temporal graph;
   an automated procedure for cutting the graph into graph partitions; and
   an automated procedure for mapping the graph partitions to pixels in frames of the video stream,
   wherein the automated procedure for creating the temporal graph comprises:
   segmenting a static image into image segments;
   computing motion vectors for the image segments;
   creating links between segments in different frames, where each link has a strength related to a correspondence between the segments; and
   populating a graph data structure so as to construct the temporal graph for a plurality of frames of the video stream.

2. The method of claim 1, wherein the automated procedure for cutting the graph into graph partitions further comprises minimizing a connectivity metric of a graph.

3. The method of claim 2, wherein the connectivity metric comprises a sum of link strengths over all links in the graph.

4. The method of claim 1, wherein the automated procedure for cutting the graph into graph partitions comprises sub-partitioning partitions.

5. The method of claim 1, wherein the automated procedure for cutting the graph into graph partitions comprises an iterative procedure where a swap of candidate nodes is performed if said swap decreases a calculated energy-like function based on the graph partitions.

6. The method of claim 1, wherein pixels assigned to each created object is well separated from a background and from surrounding objects.

7. The method of claim 1, wherein pixels assigned to a created object are used to define a moving region for a hyperlink in the video stream.

8. A computer apparatus configured for automated extraction of objects from a video stream, the apparatus comprising:
   a processor for executing computer-readable program code;
   memory for storing in an accessible manner computer-readable data;
   computer-readable program code configured to perform an automated procedure for creating a temporal graph;
   computer-readable program code configured to perform an automated procedure for cutting the graph into graph partitions; and
   computer-readable program code configured to perform an automated procedure for mapping the graph partitions to pixels in frames of the video stream,
   wherein the automated procedure for creating the temporal graph comprises:
   segmenting a static image into image segments;
   computing motion vectors for the image segments;
   creating links between segments in different frames, where each link has a strength related to a correspondence between the segments; and
   populating a graph data structure so as to construct the temporal graph for a plurality of frames of the video stream.

9. The computer apparatus of claim 8, wherein the automated procedure for cutting the graph into graph partitions further comprises minimizing a connectivity metric of a graph.

10. The computer apparatus of claim 9, wherein the connectivity metric comprises a sum of link strengths over all links in the graph.

11. The computer apparatus of claim 8, wherein the automated procedure for cutting the graph into graph partitions comprises sub-partitioning partitions.

12. The computer apparatus of claim 8, wherein the automated procedure for cutting the graph into graph partitions comprises an iterative procedure where a swap of candidate nodes is performed if said swap decreases a calculated energy-like function based on the graph partitions.

13. The computer apparatus of claim 8, wherein pixels assigned to each created object is well separated from a background and from surrounding objects.

14. The computer apparatus of claim 8, wherein pixels assigned to a created object are used to define a moving region for a hyperlink in the video stream.

* * * * *